(12) United States Patent
Douville

(10) Patent No.: US 7,821,951 B2
(45) Date of Patent: Oct. 26, 2010

(54) COMMUNICATING RISK INFORMATION WITHIN A MULTI-DOMAIN NETWORK

(75) Inventor: Richard Douville, Velizy (FR)

(73) Assignee: Alcatel-Lucent, Paris (FR)

( * ) Notice: Subject to any disclaimer, the term of this patent is extended or adjusted under 35 U.S.C. 154(b) by 106 days.

(21) Appl. No.: 12/284,048

(22) Filed: Sep. 18, 2008

(65) Prior Publication Data

US 2009/0103442 A1     Apr. 23, 2009

(30) Foreign Application Priority Data

Sep. 28, 2007  (FR) .................................. 07 06846

(51) Int. Cl.
*H04L 1/00*        (2006.01)
(52) U.S. Cl. ...................... 370/248; 370/230; 370/235; 370/254; 370/351
(58) Field of Classification Search ................. 370/248, 370/216, 217, 225, 230, 235, 254, 351; 398/2
See application file for complete search history.

(56) References Cited

U.S. PATENT DOCUMENTS

| 7,593,340 | B2 * | 9/2009 | Li et al. ...................... 370/235 |
| 2002/0191545 | A1 * | 12/2002 | Pieda et al. .................. 370/238 |
| 2005/0013241 | A1 * | 1/2005 | Beller et al. ................. 370/216 |
| 2006/0140190 | A1 * | 6/2006 | Lee ........................... 370/395.3 |
| 2008/0031619 | A1 * | 2/2008 | Xu et al. ...................... 398/2 |

FOREIGN PATENT DOCUMENTS

EP        1 675 326 A      6/2006

OTHER PUBLICATIONS

Miyamura T et al: A disjoint path selection scheme based on enhanced shared risk link group mgmt. for multi-reliability service; Global telecommunications Conference, 2005, St. Louis, MO, US.

* cited by examiner

*Primary Examiner*—Ricky Ngo
*Assistant Examiner*—Luat Phung
(74) *Attorney, Agent, or Firm*—Carmen Patti Law Group, LLC

(57) ABSTRACT

A method for communicating risk information within a network including a plurality of domains connected to one another at the border nodes of said domains, characterized by steps consisting of:
determining a connection path within a first domain (2), said path running between a border node (N21) of the first domain connected to a second domain and a recipient node,
determining a set of shared risk groups of the first domain which the connection path crosses,
assigning a shared risk identification code to said connection path,
storing, within a shared risk group management device (28) associated with the first domain, a data structure associating said shared risk identification code with said set of shared risk groups.

15 Claims, 4 Drawing Sheets

COMMUNICATING RISK INFORMATION WITHIN A MULTI-DOMAIN NETWORK

TECHNICAL FIELD

The invention pertains to the field of routing within multi-domain networks, in particular those with domains which fall under the responsibility of different operators.

BACKGROUND

The notion of sharing the risk of failure is an important concept for route computing issues. The concept of shared risk groups (SRG) was introduced in order to identify network resources which may be collectively and jointly affected by a particular event, such as the failure of a piece of equipment functionally related to all resources belonging to the group. For example, within an optical network, a shared risk link group (SRLG) may be defined to designate all optical fibers which are located within a single physical conduit, and which therefore share the risk of interruption in the event that this conduit is damaged. Shared risk groups may also be defined for other types of network resources (nodes, links) and other types of shared risks (location within the same geographic area, the same building, reliance upon the same source of electrical power, etc.)

In practice, belonging to a shared risk group is indicated by associating a shared risk group identifier (SRG ID or SRLG ID) with this resource. A resource, such as a node or link, may belong to multiple shared risk groups at once. Shared risk information, i.e. the associations between a network's physical resources and the shared risk groups defined within this network, is relatively static information which may be collected in Interior Gateway Protocol messages, and stored within a traffic engineering database so that they may be used by a route-computing device, particularly in order to compute disjoint routes. Conventionally, a connection path is considered to "cross a shared risk group" whenever its connection path uses at least one resource associated with that shared risk group. Other details on using SRLGs may, for example, be found in "Shared Risk Link Groups Inference and Processing", draft-papadimitriou-ccamp-srlg-processing-02, IETF, June 2003.

In order to allow them to operate and be administered, large modern networks, such as the Internet, are structured into domains, between which exchanges of information are subjected to certain restrictions. Examples of domains notably include routing domains, the areas and sub-areas of IGP routing protocols, and the autonomous systems (AS) of EGP routing protocols. These restrictions have both functional grounds, such as preserving the scalability of the network and preventing it from becoming overloaded, and administrative grounds, such as keeping certain information related to an operator's network confidential from other operators. In particular, shared risk information within an operator's network is sensitive data that may reveal vulnerabilities, and which must therefore be suitably protected.

With the development of IP (Internet Protocol) control plans based on the MPLS and GMPLS protocol stacks, it is possible to automate route computations and resource reservations in order to establish connections (LSP, for label-switched paths) having controlled traffic engineering characteristics (in terms of bandwidth, protection, etc.) across multi-domain networks. However, because of the restrictions imposed between domains, computing routes between domains remains an imperfectly solved problem, particularly when complex restrictions must be met.

One purpose of the invention is to facilitate the determination of disjoint routes in a multi-domain network. Another purpose of the invention is to enable the detection of a risk shared between connections of a client layer, said connections being embedded within connections of a server layer.

SUMMARY

To do so, the invention discloses a method for communicating risk information within a network including a plurality of domains connected to one another at the border nodes of said domains, characterized by steps consisting of:

determining a connection path within a first domain, said path running between a border node of the first domain connected to a second domain and a recipient node, determining a set of shared risk groups of the first domain which said connection path crosses, assigning a shared risk identification code to said connection path, storing, within a shared risk group management device associated with the first domain, a data structure associating said shared risk identification code with said set of shared risk groups, and transmitting to the second domain both route information related to said connection path and said risk information, said risk information comprising said shared risk identification code and a shared risk groups management device identifier enabling the querying of said device in order to make use of said shared risk identification code.

A shared risk identification code may be assigned locally within the first domain. This shared risk identification code makes it possible to aggregate the shared risk information relating to the connection, i.e. to give an abridged representation of all or some of the shared risk groups of the first domain crossed by the connection. This results in a reduced volume of data to communicate, when contrasted with direct communication between the shared risk groups in question.

Additionally, while the shared risk groups are information having a strong correlation with the organization and topology of the first domain's resource, it is possible to generate the shared risk identification code abstractly, in order to largely eliminate this correlation. In this manner, the shared risk identification code may be communicated outside the first domain without compromising sensitive information related to the first domain's organization.

The usage of the shared risk identification code may take multiple forms, such as checking, based on their shared risk identification code, whether two paths are SRG-disjoint (meaning that there is no shared risk group crossed by both paths), or determining a new path that satisfies a disjoint restriction, by specifying, by means of one or more shared risk identification codes, the resources that must be excluded from the new path.

The route information which is communicated to the second domain may be either more or less developed, depending on the restrictions that apply between the two domains. Information related to the nodes and links crossed by the path within the first domain may or may not be communicated. One possibility for communicating this route information while abiding by confidentiality restrictions is to use a "path-key" as a described in the proposal "Preserving Topology Confidentiality in Inter-Domain Path Computation Using a Key-Based Mechanism", R. Bradford et al., Internet Engineering Task Force, May 1, 2007.

In other advantageous embodiments, the method may exhibit one or more of the following characteristics:

the determination of the connection path is done in response to receiving a path determination request from the second domain.

the path determination request includes traffic engineering restrictions, and the connection path is determined so as to meet said traffic engineering restrictions.

the path determination request is received within a signaling message intending to establish a connection between said border node of the first domain and said recipient node, and said route information and risk information is transmitted within a signaling message confirming the establishment of said connection. Such a request may, for example, be made up of an RSVP-TE PATH including an incomplete route.

the path determination request is received by a path computation element of the first domain within a request message of the PCEP protocol, and said route information and risk information is transmitted by said path computation element of the first domain within a response message of the PCEP protocol. This embodiment makes it possible to determine the connection path before establishing the connection.

the recipient node is another border node of the first domain connected to the second domain. In such a case, the method may further comprise a step consisting of establishing, between two nodes of said second domain, a connection crossing said first domain along said connection path. This embodiment may, in particular, serve to make use of a transport layer to create a tunnel between two points of a client domain.

the second domain belongs to a client network layer including a plurality of nodes connected to communication links of a client type, and the first domain belongs to a server network layer including a plurality of nodes connected to communication links of a server type, said interconnection interfaces between the first domain and the second domain including adjustment modules for adjusting the signals of the server type to the client type and for adjusting signals of the client type to the server type. In such a multi-layer network, the transmission technologies used may, for example, be IP, Ethernet, SONET/SDH, ATM, Frame Relay, photonic, WDM, etc.

The method comprises the step consisting of distributing, by means of an interior routing protocol of the second domain, such as OSPF-TE or IS-IS-TE, a link announcement pertaining to a connection established between two nodes of said second domain, said connection crossing said first domain alongside said connection path, said link announcement including said risk information.

The method comprises the step consisting of saving, within a routing database of the second domain, a link established between two nodes of said second domain, said link corresponding to a connection crossing said first domain alongside said connection path, said saved link including said risk information.

the shared risk group management device identifier includes an IP address, such as an IPv4 or IPv6 address.

the shared risk identification code and the shared risk group management device identifier are transmitted within two fields of the same object. This formality makes it possible to preserve the association between these two pieces of data during the various protocol processes to be performed.

The invention also discloses a shared risk group management device for a communication network, said device comprising:

a data storage module for storing shared risk group information related to a network domain assigned to said device, said information comprising associations between communication resources belonging to said network domain and shared risk groups, a shared risk identification code management module designed to assign a shared risk identification code to a connection path of said network domain, to determine a set of shared risk groups which are crossed by said connection path, and to form a data structure associating said shared risk identification code with said set of shared risk groups of the domain, a usage module designed to access the data structure formed by the shared risk identification code management module, in order to process an usage request comprising said shared risk identification code, and inter-domain communication means designed both to communicate, outside of the domain, the shared risk identification codes assigned to the connection paths of the network domain and a shared risk group management device identifier making it possible to transmit usage requests to the device; and to receive a usage request from outside of the domain and transmit a response to said usage request.

The invention also discloses a multi-domain communication network comprising a first domain assigned to an abovementioned shared risk group management device, and a network element disposed outside of said first domain, said network element comprising:

a communication module for transmitting, within domains of said network, inter-domain path determination requests, and for receiving, from said network domains, response messages related to connection paths corresponding to said requests, said response messages comprising route information and risk information, said risk information of some of said response messages comprising said shared risk group management device identifier assigned to the first domain and associated shared risk identification codes, a shared risk analysis module for analyzing said received risk information and, in response to the detection of said shared risk group management device for two different connection paths, transmitting to said shared risk group management device a usage request including shared risk identification codes associated with both connection paths to determine whether or not said connections paths are disjoint.

The invention also discloses a method for computing a route within a multi-domain communication network, comprising a first domain assigned to an abovementioned shared risk group management device, comprising steps consisting of:

receiving, within a second domain of the network, a request for determining a path coming from another network domain, known as the requesting domain, said request intended to determine a connection path within said second domain, determining a connection path between two nodes of the second domain in order to respond to said request, determining whether a portion of the connection path between the two nodes of the second domain is located within said first domain of the network, obtaining risk information from said shared risk group management device, said risk information comprising a shared risk identification code assigned to the portion of the connection path located within the connection path and the shared risk group management device identifier, and transmitting to said requesting domain a response to said request comprising route information related to said connection path and said risk information.

One idea at the basis of the invention is, within each routing domain of a multi-domain network, to mask shared risk groups associated with a path by means of an abstract code associated with a reference node of the domain. Only the reference node of a domain is capable of extracting the groups associated with the codes, and for this to occur, it may be contacted at a network address which is communicated within the other domains. In this manner, a solution is proposed which reconciles the detection of risk conflicts with the confidentiality of the domains' shared risk groups.

The invention will be better understood, and other purposes, details, characteristics, and advantages thereof will become more clearly apparent upon examining the following description of multiple particular embodiments of the invention, which are given only by way of illustrative and non-limiting examples, with reference to the attached drawings. In these drawings.

Figure 1:
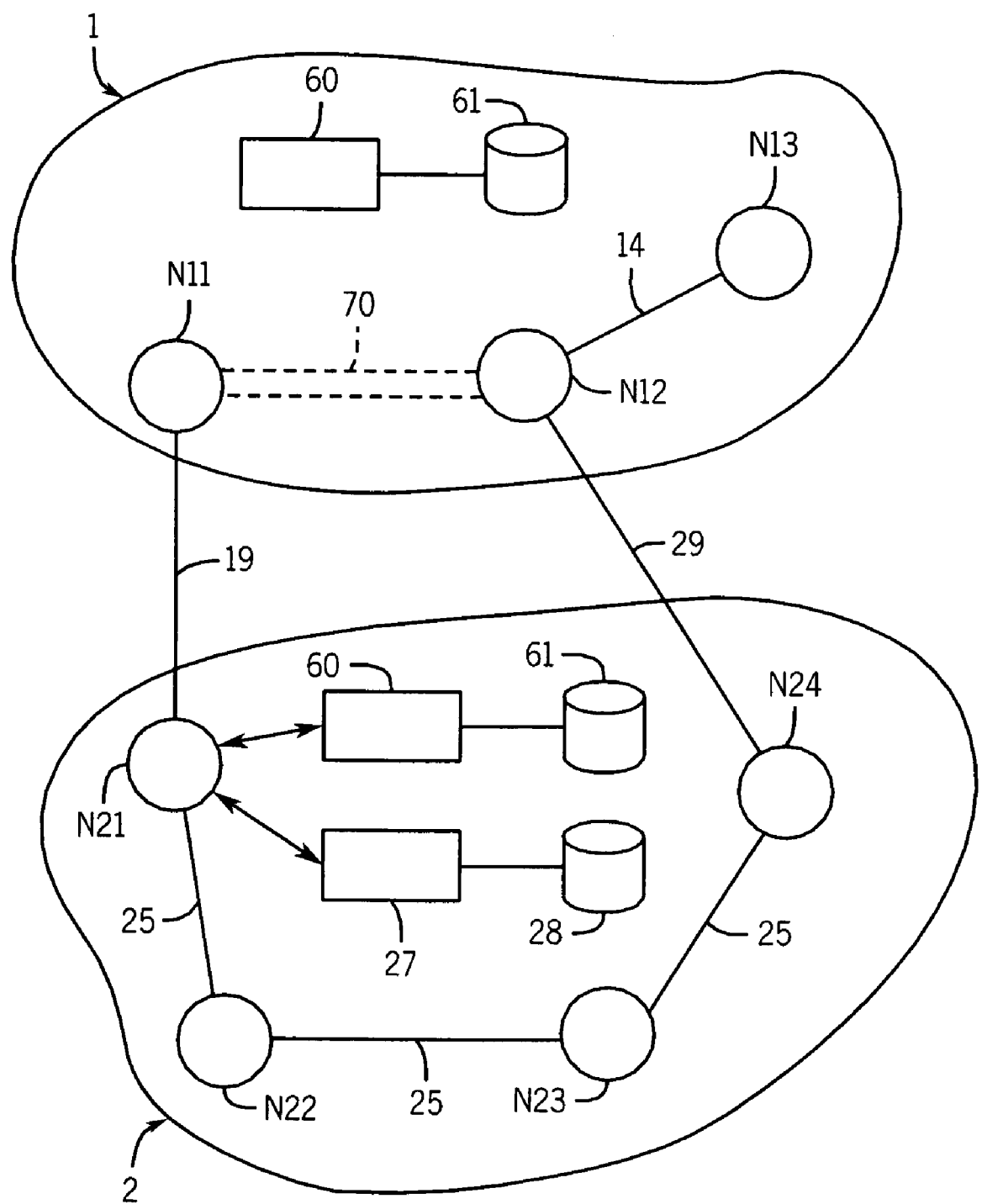
FIG. 1 is a functional schematic representation of a multi-domain network wherein embodiments of the invention may be implemented.

With reference to FIG. 1, the example communication network device comprises two routing domains 1 and 2. The term "routing domain" generally refers to a set of network elements wherein address management or path computation is placed under the responsibility of a common entity, and particularly a network belonging to a single operator, an autonomous system or group of autonomous systems, or an area or group of areas of an IGP protocol.

The domain 1 comprises three nodes N11, N12, and N13, which may for example be IP/MPLS routers. An intra-domain link 14 connects the nodes N12 and N13. No intra-domain link connects the nodes N11 and N12. The nodes N11 and N12 are edge routers which connect domain 1 with domain 2.

The domain 2 comprises four nodes N21 to N24. Intra-domain links 25 connect the nodes N21 to N24. The nodes N21 and N24 are edge routers which connect domain 2 with domain 1. An inter-domain link 19, and respectively 29, connects the nodes N11 and N21, and respectively N12 and N24.

The transmission technology within the domain 2 may be identical to or different from domain 1. If the transmission technologies are different, the domains 1 and 2 are said to belong to two different network layers. A GMPLS protocol stack may be used to deploy a unified control plan on different network layers.

Within each domain, there is at least one path computation device 60 which accesses the content of a traffic engineering database 61 in order to compute paths verifying particular restrictions within the domain. The path computation device 60 may be integrated into a node, for example an IP/MPLS router, or constructed separately from the nodes, for example in the form of a PCE (Path Computation Element). The traffic engineering database 61 may be configured manually, or supplied by an interior routing protocol such as OSPF-TE or IS-IS-TE. In one GMPLS embodiment, the traffic engineering database 61 comprises a link state database and a traffic engineering link database.

It is also assumed that shared risk groups are defined within each domain, and that SRLG ID identifiers are assigned to the various resources (links, nodes, etc.). These shared risk groups assignments, which are relatively static, are stored in a centralized or distributed manner within at least one data storage unit of the domain, such as within the traffic engineering database 61.

For reasons of security or administration, information about a domain's topology, connectivity, and shared risk groups are assumed to be kept within this domain. The domains therefore have a limited visibility of one another. For example, the domain 1 only knows the border nodes N21 and N24 of the domain 2, and the corresponding inter-domain links 19 and 29.

Figure 2:
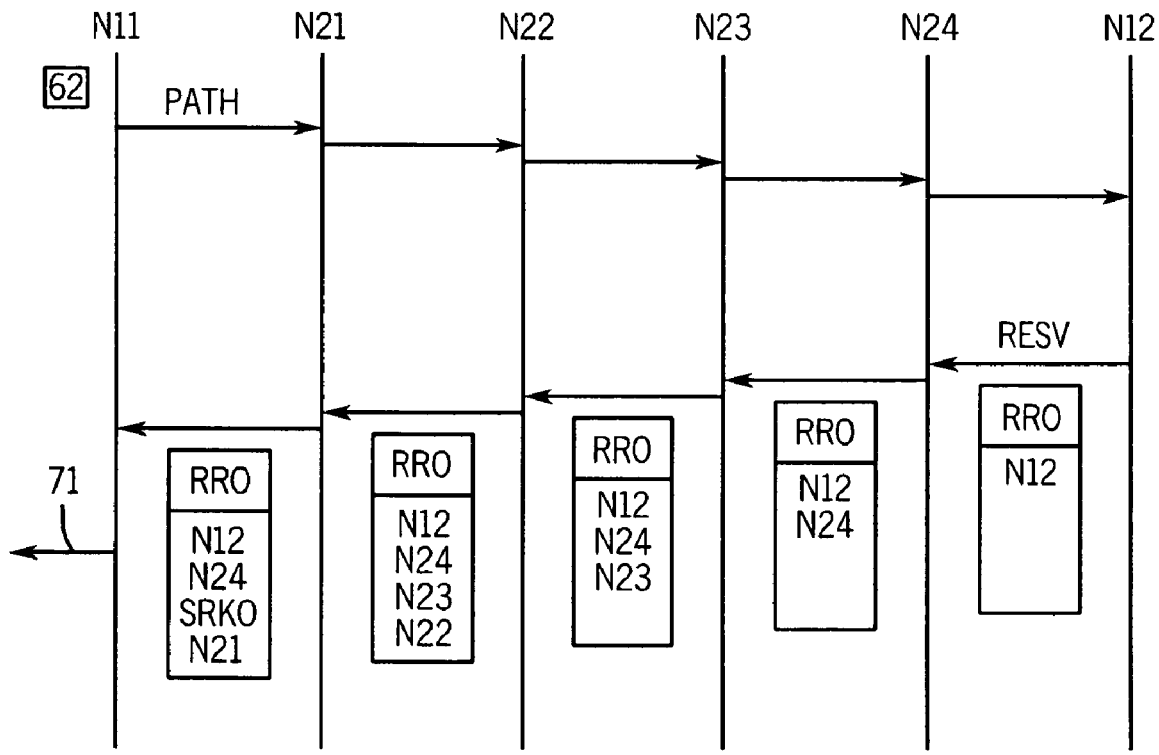
FIG. 2 is a flowchart of RSVP-TE signaling message that may be implemented within the network of FIG. 1 in order to establish a connection N11-N12.

Let us assume that a connection between N11 and N12 is desired within domain 1. The route computing device 60 of the domain 1 is capable of determining whether such a connection may be requested of the domain 2. With reference to FIG. 2, an RSVP-TE signaling method that may be implemented to establish this LSP (Label Switched Path) connection is briefly described here.

In FIG. 2, during step 62, the node N11 sends node 21 a PATH connection request message comprising characteristics of the connection to be established (such as requested bandwidth) and the destination N12. The route may not be completely given at this point by the domain 1. The PATH message therefore comprises an incomplete path (a loose hop) and a record route object (or RRO) in order to request that the tracked path be recorded, using the known technique. The connection path to be tracked within the domain 2 is determined within the domain 2, either by a centralized computation performed by the node N21 or a PCE, or by successive decisions of nodes (hop-by-hop routing). It is assumed that the path resulting therefrom is N21-N22-N23-N24-N12. The node N12 replies to the PATH message with a RESV reservation message wherein the RRO object is completed by the successive nodes in order to inform the initiating node N11 of the path. However, as the path crosses two domains, the intervening hops within the domain 2 are not necessarily communicated to N11, and may be replaced by a Path Key code PKS, using the known technique.

Before transmitting the RESV message with the RRO object to the domain 1, the node N21 adds to it risk information related to the communication resources of the domain 2 used by the connection. To do so, the domain 2 comprises a shared risk groups manager 27, which may be constructed so as to be integrated into a node or PCE, or constructed separately. Its functioning is described with reference to FIG. 3.

Figure 3:
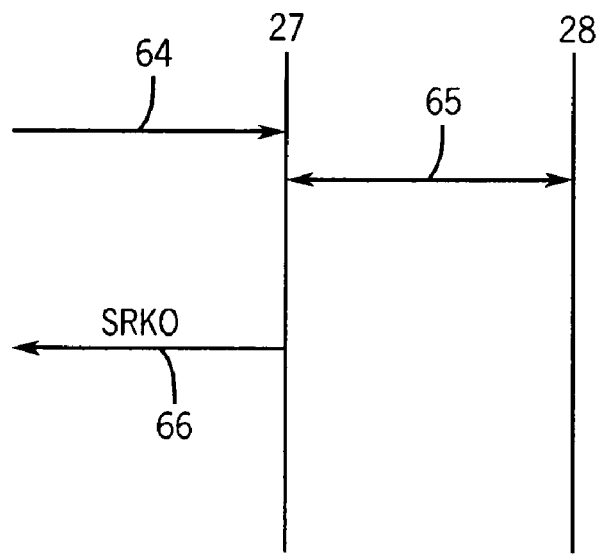
FIG. 3 is a flowchart depicting the functioning of a shared risk group manager within the network of FIG. 1.

The manager 27 is tasked with multiple tasks. It determines which shared risk groups of the domain 2 are crossed by the connection. To do so, it uses a description of the connection path, which may, for example, be provided by the node N21 (FIG. 3, step 64). Next, it accesses the shared risk group assignments (SRLG ID) of the resources, for example within the database 61. Next, it assigns one or more shared risk keys to the connection (which are different from the keys it has already assigned to other connections), and it saves, within a data storage unit 28, a data structure associating the shared risk key(s) with the shared risk groups of the domain 2 which are crossed by the connection (step 65). Finally, it re-transmits to node N21 the risk information, denoted SRK, that is to be added to the RESV message (step 66). This information is the shared risk key(s) and a network address of the manager 27, which enables elements located within other domains of the network to query the manager 27, as will be described below. The data storage unit 28 may potentially be integrated into the traffic engineering database 61 of the domain.

Figure 7:
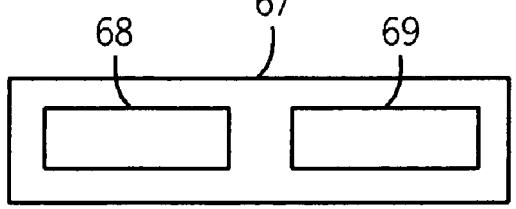
FIG. 7 depicts an object format that may be used within embodiments of the invention.

FIG. 7 depicts a format that may be used to transport the risk information related to the connection. This format consists of an object 67, which may be known as SRKO for "shared risk key", containing a sub-object 68 for storing the network address of the manager 27 and a sub-object 69 for storing the risk sharing key(s). The sub-object 68, which may be denoted Reference Node Address, may be similar to section 4.1. of the Internet draft "draft-ieff-pce-disco-proto-ospf-08". The sub-object 69, which may for example be denoted SRLG, may comply with section 2.1 of RFC 4874.

Returning to FIG. 2, the node N11 therefore receives an RESV message wherein the RRO includes the SRKO object. An LSP 70 (FIG. 1) is therefore established between N1 and N12. Within the domain 1, the LSP 70 may be considered a virtual link between the input node N11 and the output node N12, and be used as a tunnel for transporting later connections. To do so, during step 71, the routing controller of the node N11 distributes a link announcement message within the domain 1, which makes it possible to save this virtual link within the database 61 in association with the SRKO object. For example, the link announcement message may be transmitted with the OSPF-TE or IS-IS-TE protocol. To transport the SRKO object, the existing protocol mechanisms for transporting and storing the SRLG IS may be reused; see, for example, section 5.2. of the Internet draft "draft-papadimitriou-ccamp-srig-processing-02", June 2003.

The preceding description remains valid for an LSP whose endpoints are not border nodes of the domain 1.

Within the database 61 of the domain 1, it is possible that no route information indicating that the LSP 70 crosses the domain 2 is stored, and that instead, only the connection's endpoints are stored. However, by keeping the SRKO object associated with the LSP, it remains possible to detect, within the domain 2 or another domain, shared risk problems occurring within the domain 1. This point will now be illustrated with reference to FIG. 4.

Figure 4:
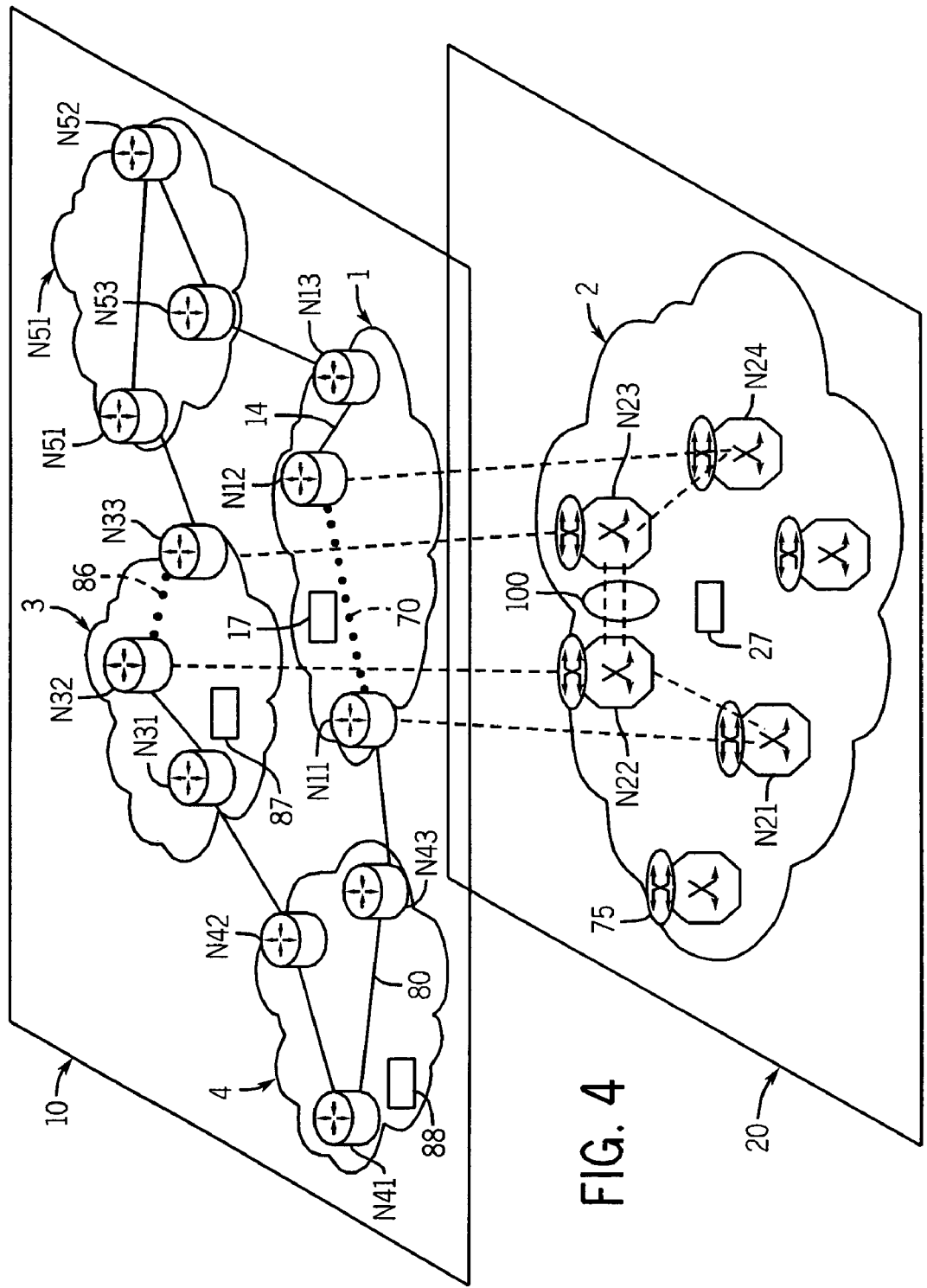
FIG. 4 is a representation of another multi-domain network wherein embodiments of the invention may be implemented.

FIG. 4 depicts another multi-domain network comprising domains 1 to 5. Reference numbers identical to those used in FIG. 1 denote identical or similar elements. In this example, the domains 1, 3, 4, and 5 belong to a network layer 10, such as an IP/MPLS layer, while the domain 2 belongs to another layer 20, such as an SDH transport layer or another transport layer. The nodes N21 to N24 are multi-service nodes connected to the layer 10 and capable of adjusting the signals to both transport technologies. Within the layer 20, node controllers 75 have been depicted separately for each node, for example to form a GMPLS control plan.

Figure 5:
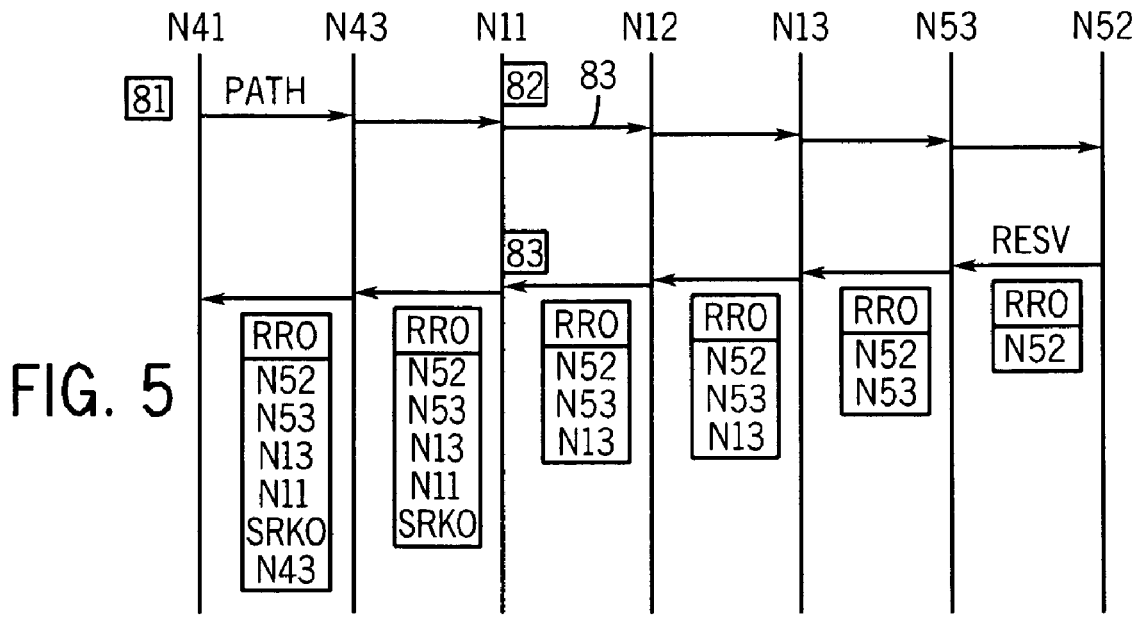
FIG. 5 is a flowchart of RSVP-TE signaling messages that may be implemented within the network of FIG. 4 in order to establish a connection N41-N52.

In FIG. 4, it is assumed that the node N41 of the domain 4 must establish two LSPs which are risk-disjoint in order to connect the node N52 of the domain 5. Disjoint inter-domain paths may be necessary, such as for reasons of protection or load distribution. As the domains only have limited visibility of one another, it is not generally possible to determine a complete route within the domain 5. It is therefore generally necessary to allow multiple domains to compute successive portions of the path. FIG. 5 depicts, by way of example, an RSVP-TE procedure for establishing an LSP 80 link in this manner.

In FIG. 5, it is assumed that the node N41 knows that the LSP must leave in the direction of the node N11 of the domain 1, for example owing to inter-domain connectivity information distributed at the network level. During step 81, the node N41 sends the node N43 a PATH connection request message comprising the characteristics of the connection to be established (such as requested bandwidth) and the destination N52. The PATH message comprises a record route object (RRO) for requesting the saving of the tracked path, using the known technique. The PATH message reaches the border node N11 of the domain 1, which triggers an intra-domain path computation within the domain 1, because the path is not described (step 82). The result of this computation may, for example, be to carry the connection within the LSP 70 all the way to the node N12, and within the link 14 all the way to the node N13. The PATH message is therefore transmitted within the tunnel 70 as though it were only one hop (step 83). The PATH messages then reaches the border node N53 of the domain 5, and finally the node N52. As in FIG. 2, the RESV message saves the path in the opposite direction within an RRO object, but certain hops may be masked, such as N12, which is not a border node. During step 85, before transmitting the RESV message with the RRO object to the domain 4, the border node N11 adds to it risk information related to the communication resources of the domain 1 used by the connection. To do so, the node N11 may call upon a shared risk group manager 17 similar to the manager 27 of the domain 2. The method described above is therefore repeated, but based upon shared risk group information related to the resources of the domain 1 in order to form an SRKO object specific to the domain 1. Within the shared risk group assignments, with respect to the link 70, the manager 17 encounters the SRKO object which was received from the domain 2 and was stored. The manager 17 must insert this object, without any changes, into the RRO object that is exiting the domain 1, which makes it possible to keep a piece of risk information indirectly indicating that the domain 2 is involved in the connection. With respect to the route information, the RRO does not normally contain any indication regarding the domain 2 in such a case, because the tunnel 70 is used. Finally, the reservation message reaches the initiating node N41 and the LSP 80 is therefore established.

To establish a second LSP, if the domain 4 does not generally have enough information to specify a disjoint path for the LSP 80 in advance, it nevertheless has access to inter-domain connectivity information enabling it to tell whether a route may exist across the domain 3. One logical approach for finding a disjoint path would therefore be to request that a second LSP be established across the domain 3, by requesting to exclude the nodes of the domains 4 and 5 used by the LSP 80. However, if the domain 3 possesses a tunnel 86 within the domain 2, as the domain 1 does, the result will not necessarily be a risk-disjoint LSP, as depicted by the LSP 90 in FIG. 4. Indeed, a shared risk exists on the link N22-N23, as depicted by the number 100.

However, if the establishment of the LSP 90 follows a procedure similar to the one described for the LSP 80, and a shared risk group manager 87 is deployed in the same manner within the domain 3, the node 41 will be able to detect this shared risk. Indeed, within the RRO object of the LSP 90, the node N42 also receives an SRKO object from the manager 27 of the domain 1. To determine whether the LSPs 80 and 90 are risk-disjoint, the node N41 or another network element of the domain 4 comprises a shared risk analysis controller 88, which compares the risk information available related to both LSPs. By comparing both SRKO objects, the analysis controller will detect the same manager address within the sub-objects 68. In response to this detection, it transmits to this address, i.e. to the manager 27 of the domain 2, a verification request that is disjoint in nature, in which it includes the sub-objects 69, i.e. the shared risk keys of both LSPs.

In response to this verification request, the manager 27 develops the shared risk keys, i.e. it extracts from the data storage unit 28 the shared risk groups of the domain 2 with which these keys are associated, and it may thereby determine whether or not the keys refer to entirely disjoint groups. A corresponding response, which in this example is negative, is transmitted to the sender of the verification request.

Another possible usage of the SRKO object is to insert it into an XRO object (an "exclude route object") of the RSVP-TE protocol, in order to specify shared risk groups that must be avoided by the connection, by analogy with section 3.1.5 of RFC 4874, or within an ERO (an "explicit route object") in order to specify shared risk groups that must be crossed by the connection.

Figure 6:
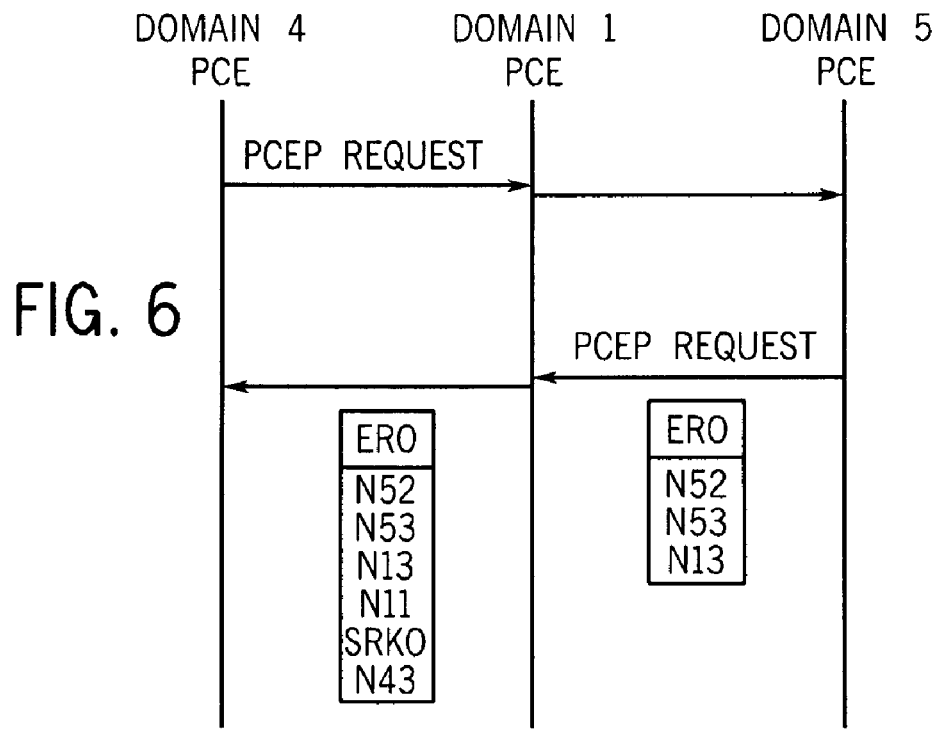
FIG. 6 is a flowchart of PCEP messages that may be implemented within the network of FIG. 4 in order to determine a connection path N41-N52.

The route and risk communication information between the domains, which were described above in the form of signaling messages exchanged by the nodes' signaling controllers, may also be performed between the path computation elements PCE attached to each domain and cooperating to compute an inter-domain route. In such a case, the PCEP protocol is used. An SRKO object may be transported within an ERO object, within the path response computed by a PCE or a string of PCEs following a request by the PCEP protocol. FIG. 6 depicts such an embodiment for a situation wherein the domain 4 seeks to compute an inter-domain route for the LSP 80, prior to requesting its establishment.

Preferably, a shared risk group manager is associated with each routing domain of the network. One manager per routing domain may be provided. However, the domain of responsibility of a shared risk group manager may also encompass multiple routing domains, such as for multiple operators having a cooperative agreement to ensure this functionality in a shared manner.

Some of the elements depicted or described, particularly the controllers, the shared risk group managers, and other modules, may be constructed in different forms, in a unitary or distributed manner, by means of hardware and/or software components. Hardware components that may be used are application-specific integrated circuits, field-programmable gate arrays, or microprocessors. Software components may be written in various programming languages, such as C, C++, Java, or VHDL. This list is not exhaustive.

Although the invention has been described in connection with multiple specific embodiments, it is naturally not in any way limited to them, and comprises all technical equivalents of the means described, as well as their combinations, if said combinations fall within the scope of the invention. In particular, the number and topology of the links, nodes, domains, and network layers appearing in the figures are purely illustrative and non-limiting.

The use of the verbs "comprise" or "include" and their conjugated forms does not exclude the presence of elements or steps other than those set forth in a claim. The use of the indefinite article "a" or "an" for an element or step does not, unless otherwise stated, excluded the presence of a plurality of such elements or steps. Multiple means or modules may be depicted by a single hardware element.

In the claims, any reference sign within parentheses should not be interpreted as limiting the claim.

The invention claimed is:

1. A method that executes on a microprocessor for communicating risk information within a network including a plurality of domains connected to one another at the border nodes of said domains, comprising the steps:

determining a connection path within a first domain belonging to a server network layer, said path running between a first border node of the first domain connected to a second domain and a second border node of the first domain connected to the second domain, said second domain belonging to a client network layer;

determining a set of shared risk groups of the first domain which the connection path crosses;

assigning a shared risk identification code to said connection path, storing, within a shared risk group management device associated with the first domain, a data structure associating said shared risk identification code with said set of shared risk groups;

transmitting to the second domain both route information related to said connection path and risk information, said risk information comprising said shared risk identification code and a shared risk group management device identifier enabling the querying of said device in order to make use of said shared risk identification code;

establishing a connection between two nodes of a same domain, said connection crossing said first domain along said connection path; and saving within a routing database of the second domain a link corresponding to said connection, said saved link comprising the shared risk group management device identifier and the shared risk identification code.

2. A method according to claim 1, wherein the determination of the connection path is performed in response to receiving a path determination request coming from the second domain.

3. A method according to claim 2, wherein said path determination request comprises traffic engineering restrictions, and in that the connection path is determined so as to satisfy said traffic engineering restrictions.

4. A method according to claim 2, wherein said path determination request is received within a signaling message intended to establish a connection between said border node of the first domain and said recipient node, and in that said route information and risk information is transmitted within a signaling message confirming the establishment of said connection.

5. A method according to claim 2, wherein said path determination request is received by a path computation element of the first domain within a request message of the path computation element communication protocol (PCEP) protocol, and in that said route information and risk information is transmitted by said path computation element within a response message of the PCEP protocol.

6. A method according to claim 1, wherein said connection between two nodes of the second domain is a client layer connection embedded within a server layer connection.

7. A method according to claim 1, wherein a client network layer comprises a plurality of nodes connected to communication links of a client type, and in that a server network layer comprises a plurality of nodes connected to communication links of a server type different from the client type, said interconnection interfaces between the first domain and the second domain comprising adjustment modules for adjusting signals of the server type to the client type and for adjusting signals of the client type to the server type.

8. A method according to claim 1, further comprising distributing, by means of an interior routing protocol of the second domain, a link announcement pertaining to said connection established between two nodes of said second domain, said link announcement including said risk information.

9. A method according to claim 1, wherein the shared risk group management device identifier includes an IP address.

10. A method according to claim 1, wherein the shared risk identification code and the shared risk group management device identifier are transmitted within two fields of the same object.

11. A system comprising a traffic engineering database for a path computation device of a first domain belonging to a client network layer, wherein the traffic engineering database is communicatively coupled with the path computation device and wherein:

the traffic engineering database comprises a record of a link between a first node and a second node of said first domain, said link corresponding to a connection established between the first node and the second node and crossing a second domain belonging to a server network layer along a connection path, said link record being associated with risk information comprising: a shared risk identification code assigned to said connection path of the second domain belonging to the server network layer, and a shared risk group management device identifier associated with the second domain belonging to the server network layer, said shared risk group management device comprising a data structure associating said shared risk identification code with a set of shared risk groups which are crossed by said connection path of the second domain belonging to the server network layer.

12. The system of claim 11 further comprising a path computation element PCE for computing paths within the first domain belonging to a client network layer, where the PCE is communicatively coupled with the traffic engineering database and the PCE has access to the content of the traffic engineering database, said path computation element being capable of:

computing a path within said first domain belonging to the client network layer, said path traveling over said link, and using the path computation element communication protocol (PCEP) protocol to transmit a path response to a third domain, said path response comprising route and risk information related to the communication resources used by said path, said risk information comprising said shared risk identification code, and said shared risk group management device identifier associated with the saved link.

13. The system of claim 11 further comprising a routing controller for the first switching node of the first domain belonging to a client network layer, characterized in that the routing controller is communicatively coupled with the traffic engineering database and the routing controller has access to the content of the traffic engineering database, and in that the routing controller is capable of distributing, by means of at least one interior gateway protocol of said first domain, a link announcement pertaining to said link, said link announcement including risk information comprising said shared risk identification code and said shared risk group management device identifier associated with the saved link.

14. A method that executes on a microcontroller for establishing an inter-domain connection, comprising:

receiving a connection request message within a first domain belonging to a client network layer, said first domain comprising a traffic engineering database and a path computation device having access to said traffic engineering database, said connection request message coming from a second domain, determining a connection path within the first domain belonging to the client network layer, said path traveling over a link registered within the traffic engineering database;

transmitting said connection request message within the first domain belonging to the client network layer, along said connection path;

transmitting a reservation message within the first domain belonging to the client network layer along said connection path in the direction opposite that of said connection request message; and transmitting said reservation message to said second domain, said reservation message transmitted to said second domain comprising risk information related to the communication resources used by said connection path, said risk information comprising, with respect to said link, a shared risk identification code and a shared risk group management device identifier associated with the saved link.

15. A method according to claim 14, wherein the risk information is transmitted within a record route object of the resource reservation protocol-traffic engineering (RSVP-TE) protocol.

* * * * *